A. D. WILLMORE.
VEHICLE ATTACHMENT.
APPLICATION FILED NOV. 13, 1918.

1,339,246. Patented May 4, 1920.

Witnesses
J. L. Wright

Inventor
Amy D. Willmore
By Victor J. Evans
Attorney ically operated device for taking the
UNITED STATES PATENT OFFICE.

AMY DORIS WILLMORE, OF MAYWOOD, BRITISH COLUMBIA, CANADA.

VEHICLE ATTACHMENT.

1,339,246.  Specification of Letters Patent.  Patented May 4, 1920.

Application filed November 13, 1918. Serial No. 262,310.

*To all whom it may concern:*

Be it known that I, AMY DORIS WILLMORE, a subject of the King of Great Britain, residing at Maywood P. O., Victoria, in the Province of B. C. and Dominion of Canada, have invented new and useful Improvements in Vehicle Attachments, of which the following is a specification.

This invention relates to new and useful improvements in directional signals for automobiles and other vehicles and the principal object of the invention is to provide a mechanplace of the driver's hand in notifying other vehicles that he is to make a turn.

Another object of the invention is to provide a device of this character which is simple and durable in construction, reliable and efficient in operation and one which can be manufactured and placed upon the market at a minimum cost.

The invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views and in which:—

Figure 1:
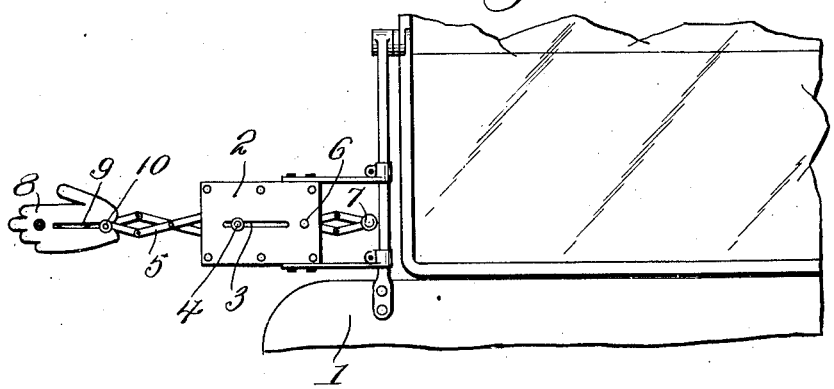
Figure 1 is a fragmentary elevation of part of a dashboard of an automobile with my invention thereon.
Figure 2:
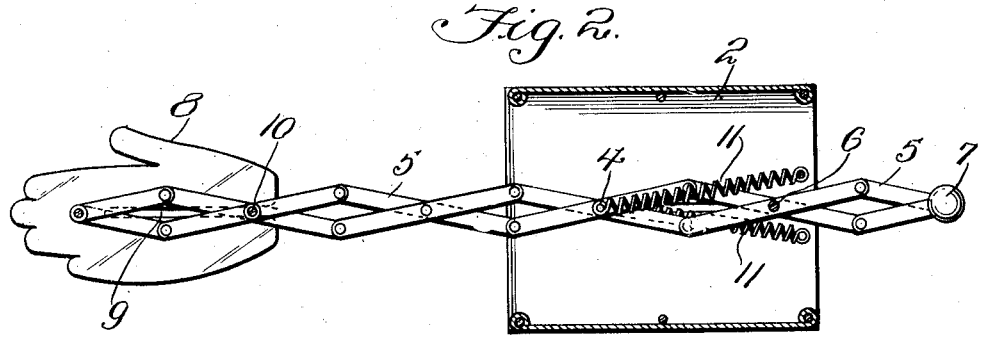
Fig. 2 is a longitudinal section of the device with the signal in extended position.
Figure 3:
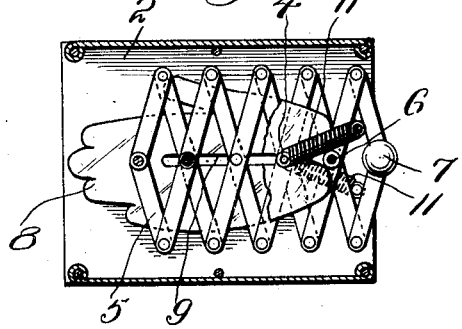
Fig. 3 is a like view with the signal in inoperative position.
Figure 4:
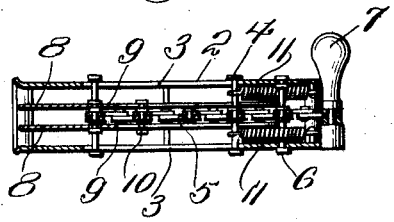
Fig. 4 is a longitudinal section taken at rightangles to Fig. 3.

In these views 1 indicates the dashboard of an automobile or other vehicle to which my device is secured. The device consists of a casing 2, having one side secured to the dash in any suitable manner. The sides of the casing are slotted as at 3 and a pin 4 has its ends sliding in said slots. 5 indicates the lazy tongs, one pivot of which is formed by the pin 4. 6 is a pin forming another pivoted joint of the tongs and this pin is secured to the casing. This stationary pin is located adjacent the rear end of the tongs and a handle 7 is secured to this end of the tongs. The other end of the tongs has pivoted thereto a pair of plates 8, formed in the shape of a hand. These plates are slotted longitudinally as at 9 and a pin 10 has its ends sliding in said slots and this pin forms a pivot for the second pair of links of the tongs. Springs 11 have one end secured to the pin 4 and the other ends secured to the casing. These springs tend to hold the pin at the rear end of the slots in the casing.

It will thus be seen that by moving the handle away from the end of the casing the lazy tongs will be extended so as to throw the hand out of the casing and beyond the side of the automobile. This will indicate that the driver is about to make a turn. As soon as the handle is released the springs will return the parts to normal position within the casing.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A device of the class described comprising a casing having slots therein, means for connecting the casing to an automobile, lazy tongs having the pivot of the second pair of levers secured to said casing and the pivot of the third pair slidingly engaging said slots, a pair of plates having slots therein secured to the end of the lazy tongs, the pivot of the next to the last pair of levers slidingly engaging said slots, springs secured to the tongs and to the casing and a handle secured to the ends of the first pair of levers for operating the tongs.

In testimony whereof I affix my signature.

AMY DORIS WILLMORE.